Oct. 29, 1963 R. K. MUELLER 3,109,163

MEMORY SYSTEM AND METHOD UTILIZING A SEMICONDUCTOR CONTAINING A GRAIN BOUNDARY

Filed Dec. 8, 1958 3 Sheets-Sheet 1

INVENTOR.
ROLF K. MUELLER
BY
Stuart R. Peterson
ATTORNEY

INVENTOR.
ROLF K. MUELLER

BY

Stuart R. Peterson

ATTORNEY

Oct. 29, 1963 R. K. MUELLER 3,109,163

MEMORY SYSTEM AND METHOD UTILIZING A SEMICONDUCTOR CONTAINING A GRAIN BOUNDARY

Filed Dec. 8, 1958 3 Sheets-Sheet 3

INVENTOR.
ROLF K. MUELLER

BY Stuart R. Peterson

ATTORNEY 3,109,163

MEMORY SYSTEM AND METHOD UTILIZING A SEMICONDUCTOR CONTAINING A GRAIN BOUNDARY

Rolf K. Mueller, St. Paul, Minn., assignor to General Mills, Inc., a corporation of Delaware Filed Dec. 8, 1958, Ser. No. 778,679
3 Claims. (Cl. 340—173)

This invention relates generally to memory systems such as would be employed in data processing, and pertains more particularly to a system in which a semiconductor grain boundary serves as the storage medium for the information to be retained.

One object of the invention is to provide a memory system lending itself readily to subminiaturization. More specifically, it is an aim of the invention to provide a simple memory device that does not involve size-limiting assembly problems in its manufacture. Heretofore, the problem of assembling each memory device has largely dictated the degree of possible miniaturization and hence the size of the over-all system utilizing a multiplicity of such devices. With the instant invention, the previously encountered assembly problems are reduced to a considerable degree.

Another object is to provide a memory system that will possess a relatively long life and which will require very little maintenance to keep it in a reliable condition.

Another object of the invention is to provide a memory system that is exceedingly fast acting. In this regard, a type of memory cell is envisaged that will have a shorter time constant than presently available devices such as electromagnetic memory systems where hysteresis effects limit the shortest obtainable time constants. Consequently, the reading in, the reading out, and the clearing of information can be performed very rapidly.

A further object is to provide a memory cell in which the read-out procedure can be either destructive or nondestructive in character depending upon the particular requirements of the memory system.

Still another object is to provide a memory system that can be cleared of information very simply and quickly.

Yet another object is to provide a memory system that can be manufactured in the form of a single matrix of semiconductive material, the individual memory cells constituting minute sections of the matrix.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

Figures 8, 9:
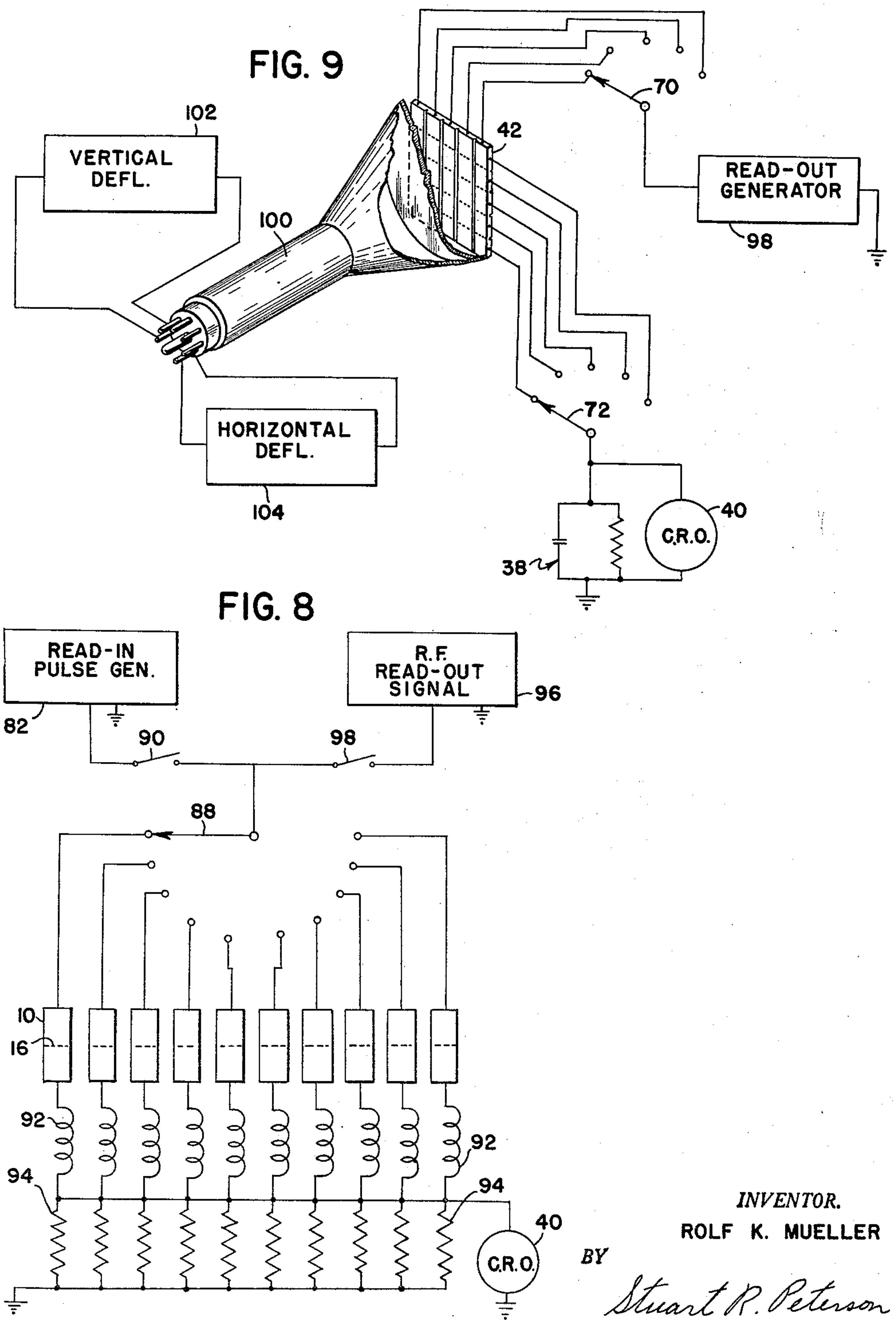

FIG. 8 presents a system in which the read-out is nondestructive in nature, the previous systems being destructive in character;

FIG. 9 represents still another form the invention may assume.

Figure 1:
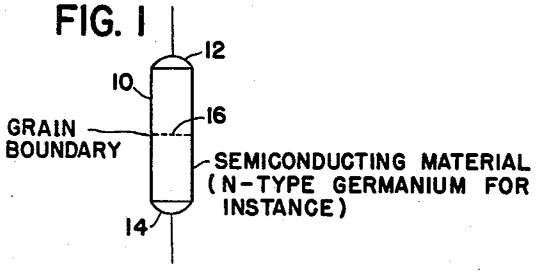
FIGURE 1 is a greatly enlarged view of a semiconductor grain boundary element constituting a single memory cell.

Discussing the diagrams individually and in detail, FIG. 1 shows a typical grain boundary cell 10. The cell consists of a block of semiconducting material with contacts 12, 14 soldered to the ends and a grain boundary 16 somewhere between the two ends. It can be explained at this point that a grain boundary is the interface between two differently oriented grains in a bicrystal or polycrystal. On either side of the boundary the semiconducting material is single crystalline, i.e., the crystal lattice is continuous. However, the two crystals are tilted with regard to one another with the result that at the junction there is a discontinuity in the crystal lattice. The discontinuity can be understood as a series of edge type dislocations. Each dislocation has dangling bonds which act as either holes or electron traps depending upon the type of semiconducting material in question. In N-type germanium, for example the dangling bond consists of an unpaired electron which traps free electrons giving the boundary a net negative charge. The net negative boundary charge repels the conduction electrons in the bulk material leaving an electron depleted region with a low conductivity adjacent to the boundary.

Figure 2:
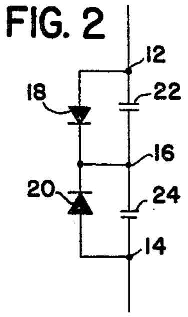
FIG. 2 is a schematic diagram representing the equivalent circuit of the cell depicted in FIG. 1.

Consequently the boundary constitutes a potential barrier to the flow of electrons and the equivalent electrical circuit consists of a series-parallel combination of two diodes 18, 20 and two condensers 22, 24 as shown in FIG. 2. The values of the two capacities are dependent upon the width of the electron depleted region which is in turn dependent upon the net charge on the boundary.

Under equilibrium conditions the height of the potential barrier in N-type germanium is of the order of a few tenths of an electron volt. If one now applies a bias of either polarity between the ends of the sample the potential barrier is lowered and an electron flow into the boundary takes place. The magnitude of this flow, and consequently the charging time, is limited only by the bulk resistance of the germanium and not by diffusion processes and minority carrier storage effects as is the case in conventional diodes.

Figure 3:
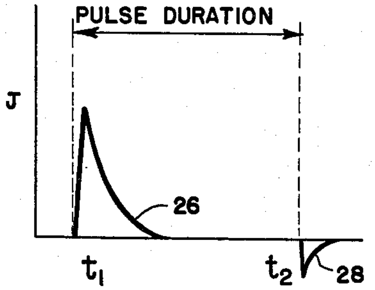
FIG. 3 is a curve illustrating the resulting current response when the cell of FIG. 1 is subjected to a charging pulse, the cell being in an initially uncharged state.
Figure 4:
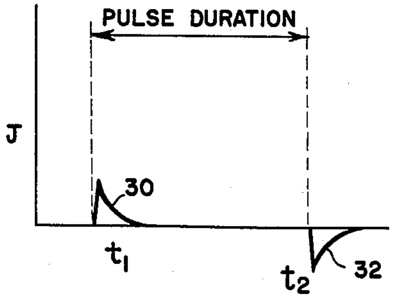
FIG. 4 is another curve, this curve illustrating the current response that occurs when the cell is already charged and is subjected to an additional charging pulse.

A pictorial representation of the current flow into the boundary which results when a square voltage pulse is applied to the sample is shown in FIGS. 3 and 4. FIG. 3 shows a current pulse 26 which results when the voltage is applied to an uncharged boundary. There is at first a rapid rise to a maximum followed by a slow decay as the boundary potential approaches that of the applied pulse. The small negative pulse, labelled 28, which appears after cessation of the applied voltage pulse is due to a redistribution of the carriers in the bulk material and is not important for the purposes of this discussion.

If, after having charged the boundary as shown in FIG. 3, one now applies a second voltage pulse of the same magnitude to the sample, one obtains the current pulse, denoted by the numeral 30, shown in FIG. 4. In this case the current is much smaller since the boundary has retained the charge provided by the previous pulse and consequently presents a large barrier to further current flow. Once again, though, a small negative pulse 32 appears after cessation of the applied voltage pulse, this pulse corresponding in magnitude to the pulse 28.

Here, then, one has a device which can be used as a memory cell in a binary system. The uncharged state could correspond to 0 while the charged state could correspond to 1. The magnitude of the current pulse resulting when an interrogating voltage pulse was applied would be an indication of the original state of the boundary. This type of interrogation is of course destructive. One could make a non-destructive interrogating system by measuring the capacity of the boundary since the magnitude of the capacity is dependent upon the boundary charge. Such a system will be described later. There are two ways that one could use to discharge the boundary and thereby return it to its 0 condition. One could alloy an ohmic contact to the boundary and short that contact to the end of the sample to discharge the boundary or one could shine light of the proper wavelength (1.7 microns in the case of germanium) on the sample. Shining light on the sample creates hole-electron pairs in the bulk material. The holes then diffuse to the boundary lowering the net charge on the boundary and effectively discharging it.

The foregoing discussion has been limited for the most part to N-type germanium where the majority carriers are electrons and the boundary contains a net negative charge since most of the present experience has been with this type of material. However, there are a number of other materials which would be suitable and which would have some advantages (and of course some disadvantages) over germanium. For instance, usable grain boundaries have been reported in N-type silicon and in P-type indium antimonide and there is reason to believe that boundaries in other III–V compounds and in silicon carbide might have useful characteristic. The discussion of the operation of the device would be the same as the foregoing for all N-type materials while for P-type materials where holes are the majority carriers, one would merely substitute holes for electrons in the discussion and postulate a boundary with a net positive charge.

As was stated previously, each type of material would have its own advantages. As an example, silicon could be used at room temperature (20° C.) while germanium must be cooled to liquid nitrogen temperature (−196° C.). The reans for this is that it takes a larger amount of energy to produce a free conduction electron in silicon and therefore there are not many carriers with enough thermal energy at 20° C. to disturb the charge on the boundary. In germanium for instance the boundary would discharge to its equilibrium value almost instantaneously at 20° C. while at −196° C. the charge changes by about 1% in three hours. Indium antimonide on the other hand having a smaller energy gap between the valence and conduction bands than germanium would have to be cooled to still lower temperatures but would respond to infrared radiation out to about 6 microns as compared to 1.7 microns for germanium. This might have advantages in some applications.

Although the discussion to this point has been restricted to memory storage devices to be used in binary systems, one could also adapt the grain boundary memory cell to operate in other systems having a larger number of characters such as our ordinary decimal system. To see how this would be accomplished refer once more to FIGS. 3 and 4. These two diagrams show the extreme cases of interrogating current pulses when the boundaries are fully discharged and fully charged respectively. If one were to have a number of voltage information pulses of different magnitudes, one could charge the boundary to a number of different levels. Then, with a voltage interrogation pulse which was equal to or larger than the largest information pulse one could determine from the magnitude of the resulting current pulse the number which had been read into the device. This type of operation offers a distinct advantage over most of the available memory devices since those devices have only two stable operating points and therefore can only be used with the binary system.

As another possibility one might use the fully charged condition as the 0 condition and the fully discharged condition as the 1 condition if the device were being used in the binary system. In this way one could introduce the information with a light beam and the interrogating pulse would always return the device to the 0 condition.

Figure 5:
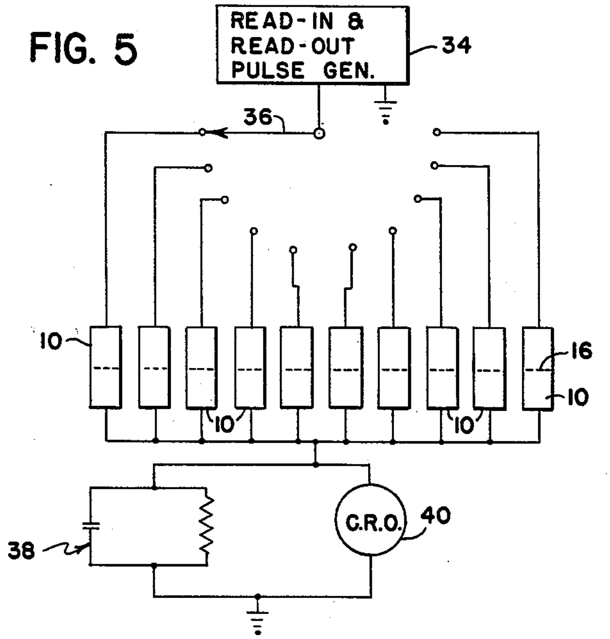
FIG. 5 is a schematic diagram illustrating one way in which information can be read into and out of my system.

In FIG. 5 a ten cell storage system is depicted. Here a pulse generator 34 functions as a combined means for both reading in information to a plurality of cells 10 and for reading out such information. As shown, the generator may be selectively connected to any given cell 10 via a rotary switch 36. In circuit with the various cells 10 is an R-C circuit 38, and in the illustrative instance a cathode ray oscilloscope 40 is connected across the circuit 38.

In use, charging pulses would be supplied by the generator 34. To charge the left cell 10 the rotary arm of the switch 36 would be positioned on the contact connected directly to this particular cell. A pulse of roughly four or five volts applied for a couple of microseconds is ample to charge the cell. When it is desired to read out the information, that is, to determine if this cell is charged, the switch arm is again positioned on the contact associated with the cell to be interrogated. When charged, as it is in the exemplary instance, a pulse commensurate in magnitude to the pulse 30 will be observed on the oscilloscope 40. In this way an indication is realized as to the information stored in this particular cell. Should any of the other cells 10 be interrogated, a large pulse similar to the pulse 26 will be discerned, for information under this assumed set of circumstances has not been read into any cell but the left-hand one.

Interrogation or read-out of such cell 10, of course, leaves it in a charged condition. Therefore it is necessary to clear all of the cells 10 of FIG. 5 before new information is read in. This can be readily accomplished by subjecting the array of cells 10 to light energy. For germanium a wavelength of 1.7 microns or below applied for a fraction of a microsecond is adequate. Generally speaking, the higher the energy gap, the shorter the wavelength of the light. The light, as previously explained, injects holes, and the holes so injected flow to the boundary and thereby neutralize the charge on the grain boundary.

Figures 6, 7:
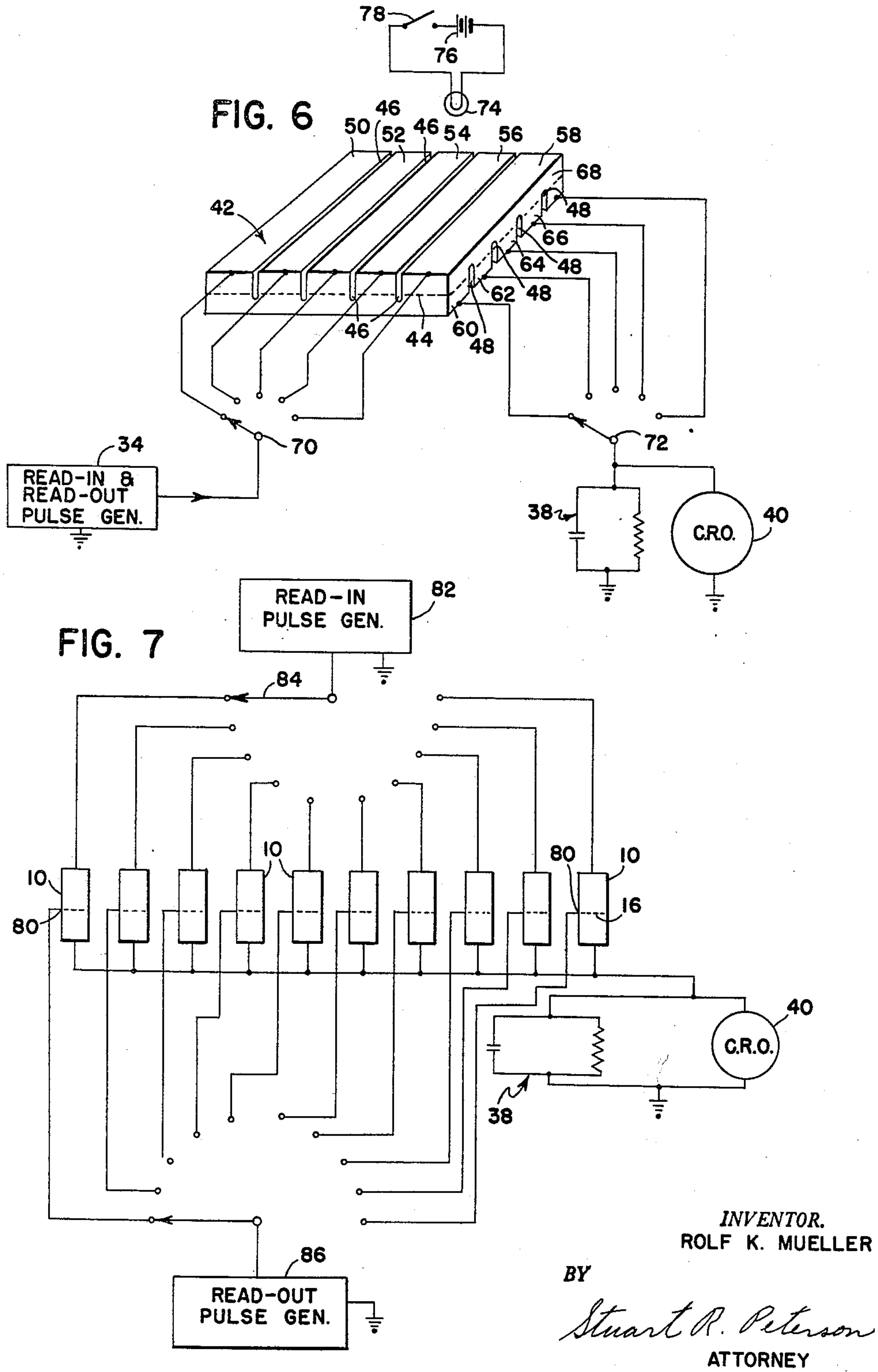
FIG. 6 is a view corresponding in operation to the system pictured in FIG. 5, the present view, however, depicting a matrix of memory cells constructed in accordance with the teachings of the invention.
FIG. 7 shows a system generally similar to FIG. 5 but in which a hole-injecting contact is located near the grain boundary of each cell for achieving a read-out of information.

The read-in and read-out scheme used in conjunction with FIG. 5 is also utilized in FIG. 6. Here, though, a matrix 42 has been provided to form a plurality of memory cells that function in the same manner as the individual cells 10. In this situation the matrix 42 was originally a small slab of semiconductive material having a grain boundary 44. The individual cells, in this case twenty-five, are formed by cutting a set of parallel grooves 46 on one side and a second set of grooves 48 on the opposite side, the two sets being perpendicular to each other. Close inspection of the figure will reveal that each set of grooves 46, 48 is deep enough to cut through the boundary 44. Photoresist and etching techniques that have been commonly employed in the making of printed circuits can be used in the fabrication of the matrix 42.

The grooves 46 divide the upper surface of the matrix 42 into individual strips 50, 52, 54, 56 and 58, whereas the grooves 48 divide the lower surface into strips 60, 62, 64, 66 and 68. Each cell, therefore, is formed by the overlapping sections of these various strips, the number of cells being twenty-five for the assumed number of strips.

In performing the read-in and read-out operations the same pulse generator 34 can be used that was employed in conjunction with FIG. 5. Through the agency of a first selector switch 70, the generator 34 may be connected to any one of the upper strips 50—58. Likewise, any one of the lower strips 60—68 may be included by way of a second selector switch 72. In circuit with this second switch 72 is the R-C circuit 38 and cathode ray oscilloscope 40, as in FIG. 5. The switches 70, 72 are positioned for either read-in or read-out of that cell formed by the overlying sections of the strips 50 and 60, which would be the cell appearing in the left-hand corner nearest the reader in FIG. 6.

While not shown in FIG. 5, a light source 74 is depicted in FIG. 6, such source being energizable from a battery 76 through a switch 78. From what has already been said, it will be understood that the light source 74 is used for clearing the various charges that might be present on any of the cells constituting the matrix 42.

Having already explained the operation of FIG. 5, it is believed that the operation of FIG. 6 will be easily understood from the description that has been given. With the arms of the switches 70 and 72 in their pictured positions, the cell formed by the overlapping or aligned sections of strips 50 and 60 will receive a charge at the grain boundary 44 when a pulse is forwarded from the generator 34. If the arm of the switch 70 is moved to its next contact, the cell constituted by the strips 52 and 60 will be charged when a pulse is transmitted. During a subsequent read-out operation both of these cells will provide relatively small pulses corresponding in magnitude to the pulse 30, whereas any of the uncharged cells will register a pulse on the oscilloscope 40 similar to the pulse 26.

It is possible, however, to make a memory cell which after read-out is in the discharged state. By introducing a hole-injecting contact 80 on the semiconductive cell 10 having the grain boundary 12, such a result is achieved. This revamped cell is depicted in FIG. 7.

In FIG. 7, instead of the read-in and read-out generator 34, a similar generator 82 is used but only for read-in purposes. As with the system presented in FIG. 5, a selector switch 84 is utilized so that a pulse can be transmitted to any desired cell 10 in order to charge same in the manner accomplished in FIG. 5.

For read-out purposes, a pulse generator 86 is employed, this generator differing from generator 82 largely by reason of the pulse magnitude it produces. More precisely, the generator 82 is designed to furnish a read-in pulse on the order of approximately five volts, but the read-out pulse supplied by the generator 86 need be only a fraction of a volt. Obviously, these values are only approximate, and will actually vary rather widely for different semiconductive materials.

The same R-C circuit 38, together with the cathode ray oscilloscope 40, may be used for observing the read-out information in the present situation. However, each cell 10 is left in an uncharged state owing to the introduction of the read-out pulse or pulses at the grain boundary 12 of those cells interrogated. Thus, while the system of FIG. 7 is destructive in character, as are the systems of FIGS. 5 and 6, the instant system is left in readiness for the receipt of new information without resort to the use of any light energy for clearing purposes.

Where a non-destructive read-out is desired, the system diagrammed in FIG. 8 may be used. In this system, the read-in pulse generator 82 of FIG. 7 may again be employed, its role being to supply only charging pulses and not any read-out pulses. The generator 82 may be connected to a selector switch 88 via a single pole switch 90.

The various contacts associated with the selector switch 88 are connected to one end of the cells 10 used in this particular system. The other ends of the cells 10 are connected to a plurality of inductance coils 92 which are connected to ground through resistors 94.

To charge any desired cell 10 of FIG. 8 one only has to close the switch 90 and by placing the movable arm of the selector switch 88 on the particular contact connected to the cell to be charged the charge representing the information to be stored can be introduced into the grain boundary 12 of the intended cell. As shown, the cell 10 at the left in FIG. 8 would receive the charge.

In order to read out the information an R-F signal generator 96 is utilized, this generator being connectable to the selector switch 88 by a single pole switch 98. The frequency supplied by the generator 96 may be of the order of one megacycle, the precise frequency not being critical. Through such an arrangement, the capacity of the cells, influenced by whether they are charged or uncharged is utilized to indicate the stored information. More specifically, with the circuit components set forth in FIG. 8 each cell 10 is made to act as a condenser in a resonant circuit, the presence of a coil 52 in each conductive path furnishing the inductance.

Obviously, by subjecting any particular cell 10 to only a small R-F sampling or interrogating signal, the information contained in a given cell 10 by reason of the charge appearing at its grain boundary 12 will not be destroyed. Hence, the instant system is truly non-destructive in nature as far as its read-out is concerned. As with the systems pictured in FIGS. 5 and 6, light impingement can be used to clear the cells 10 of FIG. 8 of their charges. Also, while the system of FIG. 8 has been described as using separate and distinct semiconductive cells 10, nonetheless it will be understood that the instant system is susceptible of use with the matrix 42 of FIG. 6, a radio frequency read-out then being substituted for the pulse read-out there exemplified.

The system pictured in FIG. 9 utilizes the matrix 42 of FIG. 6, but does so in a somewhat different manner. Nevertheless, certain similarities exist. Among these is the use of the switches 70, 72 and the cathode ray oscilloscope 40. A read-out generator 98 that can be the same as the generator 34 is also utilized. While the generators 34 and 98 may be identical, they are used in a different fashion so have been assigned distinguishing reference numerals.

The system of FIG. 9 differs appreciably from the system of FIG. 6 by reason of the environment in which the matrix 42 is placed. Here the matrix 42 is subjected to controlled light impingement. One means for accomplishing this objective is to position the matrix against the outer side of the screen of a conventional cathode ray tube 100. By breaking away portions of the glass envelope (including the screen), it is believed that this arrangement has been adequately depicted. The electron beam within the tube 100 can be conventionally controlled by reason of a vertical deflection circuit 102 and a horizontal deflection circuit 104.

In using the system of FIG. 9 all of the cells constituting the matrix 42 would receive a charge. This can be easily accomplished with the generator 98, although its principal purpose is for reading out information. At any rate, with the cells of the matrix 42 charged, the impingement of the electron beam generated within the tube 100 can be made to impinge upon selected portions of the screen, thereby producing a spot of light. For instance, if we wished to read in information to the lower right hand cell of the matrix, we would energize the circuits 102 and 104 so as to cause the electron beam to strike the screen in that region to produce the spot of light.

It has already been explained that light will cause a charged cell to become discharged. Thus the particular cell referred to will become discharged. This could represent the 1 condition if the system of FIG. 9 were being employed as a binary system. On the other hand, if the cell in question were left in its fully charged state, then it could represent the 0 condition in binary language.

Assuming now that we wish to interrogate the lower right-hand cell of the matrix in FIG. 9, the movable arms of the switches 70, 72 are already in position to do this. When a read-out pulse is transmitted from the generator 98, it follows that a large pulse (see the pulse 26 of FIG. 3) will appear on the oscilloscope 40 and it will thus be known that the 1 condition will previously have existed. However, if the cell immediately to the left is interrogated with a pulse from the generator 98, this all being in a charged condition, only a small pulse such as the pulse 30 of FIG. 4 will be discerned.

One nicety of the instant system is that the matrix 42 is always left in a charged state after a read-out operation, for the effect of any pulse from the generator is such as to cause a charging of a given cell. It is the light from the cathode ray tube that effects the discharge.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. In a memory system, a plurality of semiconductive cells in the form of a matrix having a grain boundary, said matrix constitutes a block of semiconductive material having upper and lower surfaces with said grain boundary lying therebetween, said cells being formed by a set of parallel grooves extending from one surface to a locus just beyond said grain boundary to provide a group of parallel strips extending in one direction and a second set of parallel grooves at right angles to the first set extending from the opposite surface to a locus just beyond said grain boundary to form a second group of parallel strips perpendicular to the first, means for selectively applying a potential to any desired cell to provide thereby a negative surface charge at said boundary which is representative of information to be stored in the system, and means for selectively applying an interrogating signal to any desired cell for ascertaining the state of said boundary charge and thus provide an indication of the stored information.

2. A memory system in accordance with claim 1 in which said potential applying means includes a pulse generator, a first switch means for selectively connecting said generator in circuit with any strip in said first group and a second switch means for selectively connecting said generator in circuit with any strip in said second group.

3. A memory system in accordance with claim 2 including light producing means for clearing said cells of any charge representing stored information.

References Cited in the file of this patent

UNITED STATES PATENTS

| | | |
|---|---|---|
| 2,592,683 | Gray | Apr. 15, 1952 |
| 2,666,816 | Hunter | Jan. 19, 1954 |
| 2,790,088 | Shive | Apr. 23, 1957 |
| 2,795,742 | Pfann | June 11, 1957 |

OTHER REFERENCES

Handbook of Semiconductor Electronics, by L. Hunter, McGraw-Hill Book Co., 1956, pages 15–49 to 15–50.